United States Patent [19]

Blevins

[11] Patent Number: 4,822,834

[45] Date of Patent: Apr. 18, 1989

[54] VIBRATION DAMPING COMPOSITION SUITABLE FOR OUTER SPACE TEMPERATURE VARIATIONS

[75] Inventor: Creed E. Blevins, Orange, Calif.

[73] Assignee: The United States of America as represented by the Secretary of the Air Force, Washington, D.C.

[21] Appl. No.: 183,200

[22] Filed: Apr. 19, 1988

[51] Int. Cl.$^4$ .......................... C08K 3/04; C08K 3/10; C08L 9/02

[52] U.S. Cl. ................................ 524/427; 524/431; 524/493; 524/503; 524/519

[58] Field of Search ............... 524/493, 427, 431, 519, 524/503

[56] References Cited

U.S. PATENT DOCUMENTS

| | | | |
|---|---|---|---|
| 3,271,188 | 9/1966 | Albert et al. | 117/132 |
| 3,399,103 | 8/1968 | Salyer et al. | 161/68 |
| 3,489,242 | 1/1970 | Gladding et al. | 181/33 |
| 3,994,845 | 11/1976 | Blachford | 260/23 R |
| 4,162,241 | 7/1979 | Canter et al. | 524/392 |
| 4,233,073 | 9/1980 | Caldwell et al. | 428/422 |
| 4,237,176 | 12/1980 | Brueggemann et al. | 428/212 |
| 4,311,751 | 1/1982 | Brueggemann et al. | 428/523 |
| 4,369,284 | 1/1983 | Chen | 524/476 |
| 4,390,976 | 6/1983 | Eynck | 367/149 |
| 4,429,068 | 1/1984 | Nakahira | 524/303 |
| 4,566,231 | 1/1986 | Konsevich | 52/145 |
| 4,623,586 | 11/1986 | Umeya et al. | 524/493 |
| 4,678,707 | 7/1987 | Shinozaki et al. | 428/461 |
| 4,734,323 | 3/1988 | Sato et al. | 428/519 |
| 4,740,427 | 4/1988 | Ochiumi et al. | 428/461 |

*Primary Examiner*—Herbert J. Lilling
*Attorney, Agent, or Firm*—Robert L. Nathans; Donald J. Singer

[57] ABSTRACT

Viscoelastic constrained layer vibration damping composition having a shear storage modulus of 500±100 psi consisting essentially of about 100 parts by weight of a butyl rubber having a glass transitional point temperature of −50 degrees F.±15 degrees, 100 parts by weight of a nitrile rubber having a glass transitional point temperature of 60 degrees F.±15 degrees, 50 parts by weight of a thermoplastic polymer having a glass transitional point temperature of 130 degrees F.±15 degrees, 45 parts by weight of a plasticizer, and 50 parts by weight of a powdered filler.

20 Claims, 1 Drawing Sheet

4,822,834

VIBRATION DAMPING COMPOSITION SUITABLE FOR OUTER SPACE TEMPERATURE VARIATIONS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of vibration damping materials and more particularly constrained layer damping materials.

Constrained layer damping materials are required for use in outer space. For example, a constrained layer damping material is utilized between a first and second structural member in order to reduce the transmission of mechanical shock waves or vibrations. An orbiting space station, for example, will be exposed to extreme temperature variations as the vehicle faces the sun and is hidden from the sun as it rotates about the earth. When hidden from the sun, temperatures of −100 degrees F. will be present whereas the vehicle faces the sun, temperatures of plus 160 degrees F. will be present.

The viscoelastic property of such material behaves partially as an elastic rubber band which, after being stretched and released, retracts to its original shape. Such material also acts like a putty which absorbs energy and retains its newly formed shape. The viscoelastic materials combine these two attributes so that although the material returns to its original shape after being stressed, it does so slowly enough to oppose the next cycle of vibration. In other words, such materials have a non-linear response to stress and examination of the stress-strain graph of such material reveals a hysteresis loop, the area of which is a function of energy dissipated as heat for each cycle. Thus, the kinetic energy of vibration is converted into heat, and as a result, vibration is damped. When the applied stress and resulting strain are out of phase with respect to time, Young's modulus is a complex quantity, namely $E_1 + iE_2$, $E_1$ representing the elastic modulus and $E_2$ representing the energy loss modulus. The ratio of $E_2/E_1$ defines the well-known loss factor n. Accordingly, the greater the energy conversion into heat, the higher the loss factor and the more effective is the damping material.

OBJECTS AND SUMMARY OF THE INVENTION

It is thus a principal object of the invention to provide an improved constrained layer composite damping material having a high loss factor throughout an extended temperature range of about −100 degrees F. to +160 degrees F.

The composition of the present invention includes a composition of two different elastomers, a thermoplastic polymer, a plasticizer and a reinforcing filler. The first elastomer has a glass transitional point temperature of −50 degrees F., the second elastomer has a glass transitional point temperature of +60 degrees F. and the thermoplastic material has a glass transitional point temperature of +130 degrees F.

BRIEF DESCRIPTION OF THE DRAWINGS

Other objects, features and advantages of the present invention will become apparent upon study of the following detailed description taken in conjunction with the drawings in which.

DETAILED DESCRIPTION OF A PREFERRED EMBODIMENT

The preferred composition of the invention is fabricated by providing a first elastomer having a glass transitional point temperature of −50 degrees F.±15 degrees. The first elastomer preferably consists of butyl rubber such as a rubber available from Exxon Corporation and marketed under the trade name "Enjay 268". Other materials believed suitable are chloro-butyl rubber, or an elastomer marketed by Dupont under the trade name VAMAC, or other natural rubbers. The second elastomer preferably consists of a nitrile rubber. The second elastomer actually utilized in the production of the preferred composition was purchased from Uniroyal and sold under the trade name "Paracril-d". For an explanation of the nature and composition of butyl rubber and nitrile rubber, reference can be made to Van Nostrand's Scientific Encyclopedia, volume 1 of the sixth edition, 1983, pages 1025, 1026. It is important, however, that the first elastomer have a glass transitional point temperature of −50 degrees F.±15 degrees, and that the second elastomer have a glass transitional point temperature of +60 degrees F.±15 degrees. A thermoplastic polymer is added to the mixture of the above-stated ingredients, and has a glass transitional point temperature of +130 degrees F.±15 degrees. While a polyvinyl butyral is preferred, other thermoplastic polymers may be utilized, provided they have a glass transitional point temperature of 130 degrees F.±15 degrees. A plasticizer is added to the mixture such as "TP-95" marketed by ThioKol. Numerous other plasticizers may, of course, be utilized; "TP-95" is a hydrocarbon oil. A reinforcing filler is also added, such as SAF carbon black. Virtually any type of carbon black is suitable. Other suitable fillers may be utilized, such as silica powder, iron oxide powder, or powdered calcium carbonate. A catalyst such as dicumyl peroxide is added to vulcanize the elastomers, and a curing agent such as zinc oxide and an anti-oxidant such as "2246" marketed by Vanderbilt may optionally be utilized.

On a heated rubber mill, the composition is mixed by first adding the elastomers and polymer resin followed by the filler and plasticizer, and finally the curing agents. The uncured mixture may then be calendared out to a prescribed thickness. Using a press cure, sheets of the resulting rubbery material may be vulcanized into a variety of constrained layer damping configurations such as that shown in FIG. 2.

In the tested composition the proportions by weight of the aforesaid ingredients were as follows:

| Material | Weight (gm) |
| --- | --- |
| Butyl (Enjay 268) | 100 |
| Paracril-D | 100 |
| Polyvinyl Butyral | 50 |
| TP-95 | 45 |
| SAF Carbon Black | 50 |
| ZnO | 10 |
| Antioxidant 2246 | 1 |

| Material | Weight (gm) |
| --- | --- |
| Dicumyl Peroxide | 7 |

Figure 2:
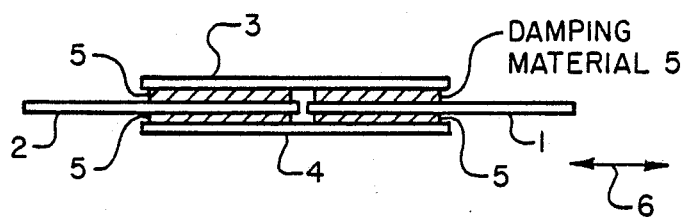
FIG. 2 illustrates the constrained layer damping material positioned between a plurality of plates.

The resulting viscoelastic sheet material 5 was positioned between constraining plate members 1, 2, 3 and 4; of FIG. 2. Layers 5 had a thickness of 0.05 inches. A piezo-electric transducer coupled to the right hand portion of plate 1 produced sinusoidal vibration thereof, having a zero to peak amplitude of 81 micro-inches, indicated by arrow 6. A load cell measuring output forces was coupled to plate 2, and the loss factor was thus measured in accordance with the steady state sine method known to workers in the art, and described in the literature, e.g. printed proceedings of the USAF vibration damping conference of 1984, held at USAF Flight Dynamics Laboratory, Long Beach, Calif. This method is more accurate for small amplitudes than comparing the output and input sine wave amplitudes and phase angles between the waves.

Figure 1:
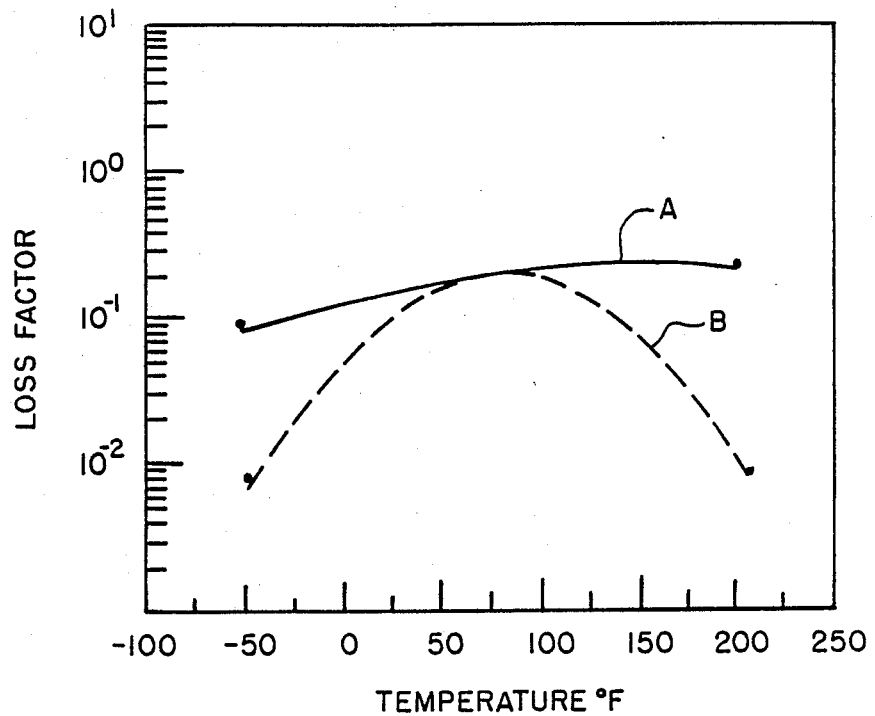
FIG. 1 illustrates the above-mentioned enhanced loss factor which is produced within the extremely wide temperature range mentioned above.

The excellent results of this test are shown in FIG. 1. The loss factor n (curve A) remains quite high over the extreme temperature range, and is favorably compared to General Electric SMRD 100 F90 material (curve B) comprising silicone and micro balloons. Excitation of plate 1 was at 0.25 and 1 herz; frequencies of 25 and 100 Hz. also produced good results over the extreme temperature ranges indicated in FIG. 1.

Although this invention has been described with reference to a particular embodiment, it will be understood that this invention is also capable of further other embodiments within the spirit and scope of the appended claims.

What is claimed is:

1. A viscoelastic constrained layer vibration damping composition having a shear storage modulus of 500±100 psi consisting essentially of: 50 to 150 parts by weight of a first elastomer having a glass transitional point temperature of −50 degrees F.±15 degrees, 50 to 150 parts by weight of a second elastomer having a glass transitional point temperature of 60 degrees F.±15 degrees, 25 to 75 parts by weight of a thermoplastic polymer having a glass transitional point temperature of 130 degrees F.±15 degrees, 20 to 70 parts by weight of a plasticizer, and 25 to 75 parts by weight of a powdered filler.

2. The composition of claim 1 wherein said first elastomer consists of butyl rubber.

3. The composition of claim 2 wherein said butyl rubber is a chlorobutyl rubber.

4. The composition of claim 1 wherein said second elastomer consists of a nitrile rubber.

5. The composition of claim 2 wherein said second elastomer consists of a nitrile rubber.

6. The composition of claim 3 wherein said second elastomer consists of a nitrile rubber.

7. The composition of claim 5 wherein said thermoplastic polymer consists of polyvinyl butyral.

8. The composition of claim 1 wherein said powdered filler is selected from the group consisting of carbon black silica, iron oxide, and calcium carbonate.

9. The composition of claim 5 wherein said powdered filler is selected from the group consisting of carbon black, silica, iron oxide, and calcium carbonate.

10. The composition of claim 1 further including a catalyst for enabling said first and second elastomers to be vulcanized.

11. The composition of claim 4 further including a catalyst for enabling said first and second elastomers to be vulcanized.

12. The composition of claim 5 further including a catalyst for enabling said first and second elastomers to be vulcanized.

13. A viscoelastic constrained layer vibration about damping composition having a shear storage modulus of 500±100 psi consisting essentially of about 100 parts by weight of a first elastomer having a glass transitional point temperature of −50 degrees F.±15 degrees, 100 parts by weight of a second elastomer having a glass transitional point temperature of 60 degrees F.±15 degrees, 50 parts by weight of a thermoplastic polymer having a glass transitional point temperature of 130 degrees F.±15 degrees, 45 parts by weight of a plasticizer, and 50 parts by weight of a powdered filler.

14. The composition of claim 13 wherein said first elastomer consists of butyl rubber.

15. The composition of claim 14 wherein said butyl rubber is a chlorobutyl rubber.

16. The composition of claim 13 wherein said second elastomer consists of a nitrile rubber.

17. The composition of claim 14 wherein said second elastomer consists of a nitrile rubber.

18. The composition of claim 15 wherein said second elastomer consists of a nitrile rubber.

19. The composition of claim 17 wherein said thermoplastic polymer consists of polyvinyl butyral.

20. The composition of claim 19 wherein said powdered filler is selected from the group consisting of carbon black, silica, iron oxide, and calcium carbonate.

* * * * *